United States Patent [19]
Archer et al.

[11] Patent Number: 5,205,038
[45] Date of Patent: Apr. 27, 1993

[54] METHOD OF REPLACING A TUBE ON A STRAIGHT-TUBE HEAT EXCHANGER

[75] Inventors: Jacques Archer, Chatenay-Malabry; Georges Moreau, Viriat; Daniel Besson; Benoit Giraud, both of Lyons, all of France

[73] Assignee: Framatome, Courbevoie, France

[21] Appl. No.: 762,268

[22] Filed: Sep. 19, 1991

[30] Foreign Application Priority Data

Sep. 19, 1990 [FR] France ................. 90 11574

[51] Int. Cl.⁵ .............................................. B23P 15/26
[52] U.S. Cl. .............................. 29/890.031; 29/890.043; 29/426.4; 228/183
[58] Field of Search .............. 29/890.043, 890.031, 29/426.4, 426.5, 428; 228/183, 119

[56] References Cited

U.S. PATENT DOCUMENTS

| | | | |
|---|---|---|---|
| 2,996,600 | 8/1961 | Gardner et al. | 29/890.043 |
| 3,962,767 | 6/1976 | Byerley et al. | 29/890.031 |
| 4,694,549 | 9/1987 | Rabe | 29/890.031 |
| 4,943,001 | 7/1990 | Meyer | 29/890.043 |

FOREIGN PATENT DOCUMENTS

0234920 9/1987 European Pat. Off. .
0288359 10/1988 European Pat. Off. .

OTHER PUBLICATIONS

Patent abstracts of Japan-vol. 4 No. 7 (C-070) Oct. 19, 1980.
Patent abstracts of Japan-vol. 13 No. 194 (M-823) (3542) May 10, 1989.

*Primary Examiner*—Irene Coda
*Attorney, Agent, or Firm*—Pollock, Vande Sande & Priddy

[57] ABSTRACT

A transverse cut (18, 19) is made on a heat exchanger tube (4) to be replaced in the vicinity of its connectors (14, 15), at each end. A cut (19') is made in the frusto-conical zone (16') of connection of the tube (4) to the second connector (15). The cutting operations are effected from inside the tube (4) and through one of the tube plates (2, 3). The tube (4) to be replaced is extracted from the heat exchanger through the interior of the second connector (15) and the corresponding opening (13) in the second tube plate (3). A replacement tube is introduced into the heat exchanger through the opening (13) in the second tube plate (3) until a first end of the tube engaged in the heat exchanger reaches the level of the cut zone (18) of the first connector (14). The first end of the tube is welded on the first connector (14). The length of the replacement tube is adjusted so that its second end can be engaged in the second connector (15) over a predetermined length, and the second end of the replacement tube is joined by an overhang weld inside the second connector (15).

8 Claims, 4 Drawing Sheets

FIG. 1

FIG_10

FIG_3

FIG_6

FIG_7

FIG_8

FIG_9

METHOD OF REPLACING A TUBE ON A STRAIGHT-TUBE HEAT EXCHANGER

FIELD OF THE INVENTION

The invention relates to a method of replacing a tube in a straight-tube heat exchanger comprising two substantially parallel tube plates spaced apart from one another and comprising openings at openings at which the tubes are fixed at their ends.

The invention is in particular applicable in the case of a straight-tube steam generator of a fast-neutron nuclear rector cooled by a liquid metal, such as sodium.

BACKGROUND OF THE INVENTION

Steam generators of liquid-metal cooled fast-neutron nuclear reactors are known which comprise a bundle formed by an assembly of parallel straight tubes fixed at their ends in tube plates parallel to one another and fastened to the outer casing of the steam generator. In the interior of the steam-generator casing the tube plates delimit three successive zones, namely, a water container, a circulation zone for the heat-transporting liquid metal in contact with the outer surface of the tubes of the bundle, and a steam header.

Through their entire thickness the tube plates are pierced by holes, in the axis of each of which the end of a tube is fixed by welding to a tubular connector projecting from the inner face of the tube plate, this connector generally being referred to as a "nipple".

Each of the tubes of the heat exchanger bundle is fixed at one end on a first connector of a first tube plate, and at its other end on a second connector of a second tube plate, the inside diameter of the second connector and of the corresponding opening of the second tube plate being slightly greater than the outside diameter of the tube which is connected to the second connector by a junction zone of frustoconical shape.

Each of the tubes thus forms the connection between the water container and the steam header, the feed water of the steam generator, distributed over all the tubes of the bundle at the outlet of the water container, then being heated and vaporized inside the tubes through thermal contact with the heat-transporting liquid metal. The steam formed in the tubes is then recovered in the steam header.

The hot liquid sodium is generally brought to the top part of the steam generator, in the vicinity of the tube plate delimiting the steam header; the liquid sodium then circulates vertically outside the tubes of the bundle.

If one of the tubes is defective (for example, cracked) so that it leaks, this leak must be detected very quickly, so that the operation of the steam generator can be halted and the generator emptied before the reaction between the liquid sodium and the water flowing through the leak progresses to such an extent that the steam generator may be damaged and it will no longer be possible to master this reaction with the safety means provided on the steam generator, which damp the pressure waves in the sodium.

A leak in one of the steam generator tubes can be discovered either by detection of the hydrogen which is formed by the reaction of the water on the sodium, or by acoustic detection of the noise of the reaction.

After complete emptying of the steam generator, it is necessary to carry out a repair on the leaking defective tube, either by plugging or by replacement in order to enable the steam generator to be put back into service.

For the plugging of a defective steam-generator tube various techniques have been proposed, as described for example in FR-A-2,524,609 and FR-A-2,560,962.

In FR-A-2,524,609, it is proposed to effect the plugging of the tube by automatic displacement of a valve situated inside the tube, in such a manner as to close off the tube through the action of the difference in pressure accompanying the occurrence of the leak and the consequent reaction between the sodium and the water. This plugging of the tube makes it possible to prevent the leak from having harmful consequences, by reliably and immediately separating the water or steam under pressure from the sodium.

In FR-A-2,560,962 it is recommended to effect the plugging by placing in position a flexible sleeve, disposed axially inside the tube and fixed by mechanical keying or by explosive welding.

Actually, plugging techniques making use of expanding sleeves, valves, or the fastening of a closure means by flanging, explosive welding or keying, are no longer in use within the scope of maintenance or repair operations for steam generators utilizing liquid sodium as primary fluid. It is in fact necessary during operation to maintain absolute leaktightness between the water and the liquid sodium. None of the techniques mentioned above makes it possible to ensure such absolute leaktightness and its maintenance over a period of time.

In addition, the proportion of tubes closed off in the course of successive repair operations on a steam generator must not exceed a certain percentage of the total number of tubes.

It is generally considered that this percentage should be between 10 and 15% of the tubes.

The technique of plugging tubes has the disadvantage of entailing a loss of power of the steam generator and of introducing temperature asymmetry in the bundle of tubes, so that the other tubes of the bundle are subjected to increased thermomechanical stresses.

Furthermore, for reasons of safety it is not possible to place plugs on the outer walls of the tube plates of a steam generator, i.e., on the water-container side or on the steam-header side. In this case, in fact, the detection of hydrogen or acoustic detection enabling the occurrence of a water or steam leak into the sodium to be discovered cannot be achieved reliably and quickly. Belated detection of water leakage into the sodium entails very serious disadvantages, which have been mentioned above.

Tube-closing plugs must therefore be placed on the inside walls of the tube plates, i.e., the walls directed towards the zone of the steam generator enclosing the sodium and the bundle of tubes. Tube plates have thicknesses which may be relatively considerable, for example of the order of 400 mm, so that the plugs must be placed on walls situated at substantial distances from the outside access faces of the tube plates. This makes it difficult to place the plugs in position.

Moreover, the welding of a plug closing a tube in a steam generator in which the primary fluid consists of sodium is just as delicate an operation as the welding of the original tube which has to be plugged, and must be carefully checked.

SUMMARY OF THE INVENTION

The object of the invention is therefore to provide a method of replacing a tube of a straight-tube heat exchanger comprising two substantially parallel tube plates spaced apart from one another and comprising openings at which the tubes are fixed at their ends by welding to connectors, each of the tubes of the heat exchanger bundle being fixed at one end on a first connector of a first tube plate, and at its other end on a second connector of a second tube plate, the inside diameter of at least one of the connectors or second connector and of the corresponding opening of the second tube plate being substantially greater than the outside diameter of the tube which is connected to the second connector by a frustoconical junction zone shape, this method making it possible in particular to avoid the disadvantages connected with the repair of the tubes of a steam generator by plugging, and to ensure excellent behavior of the tube in the steam generator, after the latter has been put back into operation.

To this end:
- a transverse cut is made on the tube in the vicinity of the connectors, at each end, from the interior and through one or other of the tube plates,
- a cut is made in the frustoconical zone of connection of the tube to the second connector,
- the tube to be replaced is extracted from the heat exchanger space between the tube plates, through the interior of the second connector and of the corresponding opening in the second tube plate,
- the zones where the cuts were made are cleaned and remachined,
- a replacement tube is introduced into the heat exchanger by way of the opening in the second tube plate until a first tube end first engaged in the heat exchanger reaches the level of the cut zone of the first connector,
- the first end of the tube is joined by an overhang weld on the first connector,
- the length of the replacement tube is adjusted so that its second end is engaged over a predetermined length in the second connector, and
- the second end of the tube is joined by an overhang weld in the interior of the second connector.

BRIEF DESCRIPTION OF THE INVENTION

In order to enable the invention to be well understood a description will now be given, by way of example and with reference to the accompanying drawings, of one embodiment of the method according to the invention for replacing a tube in a steam generator of a liquid sodium-cooled fast-neutron nuclear reactor, and of the corresponding devices enabling this method to be carried out.

DESCRIPTION OF THE PREFERRED EMBODIMENT

Figure 1:
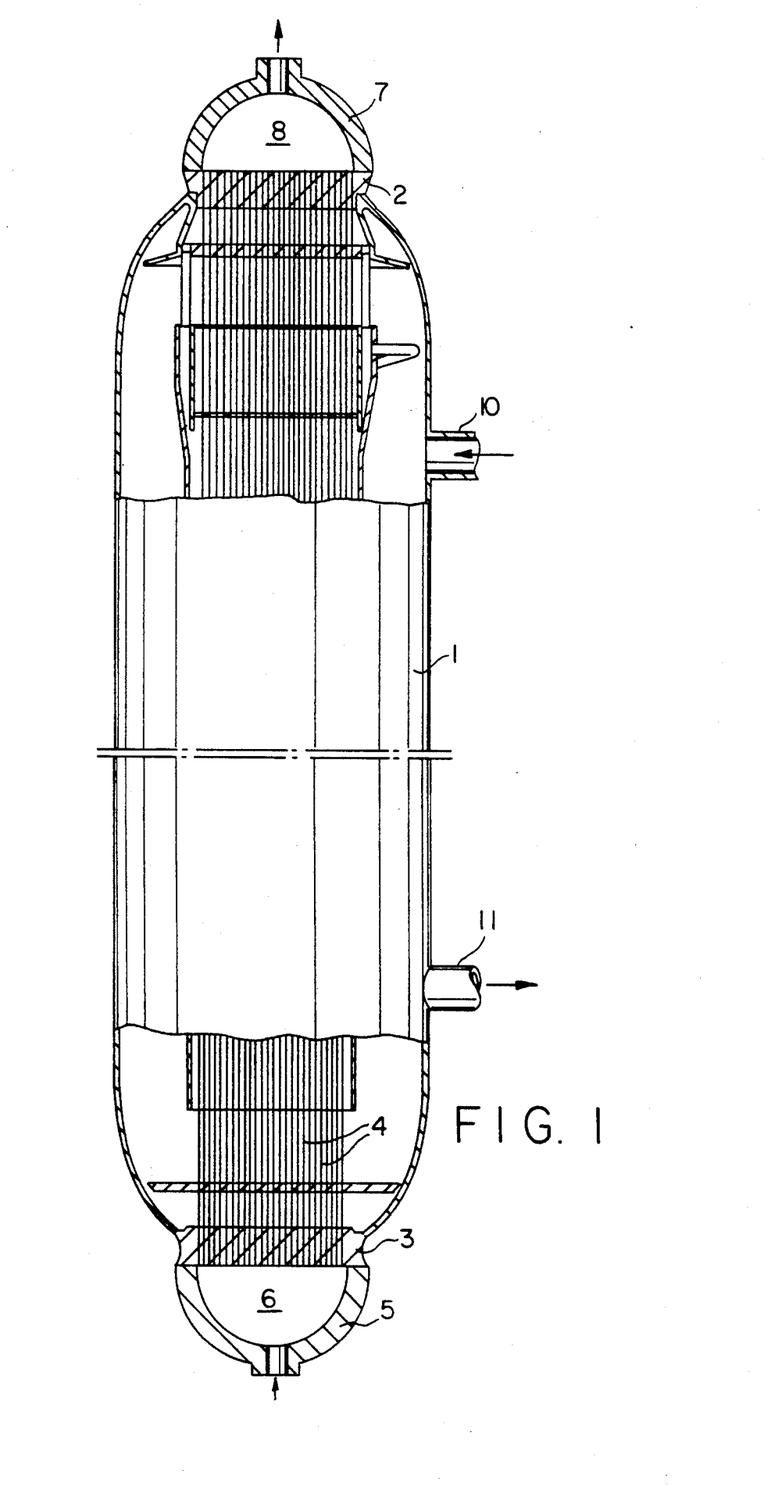
FIG. 1 is a view in elevation and partial section of a straight-tube steam generator in a fast-neutron nuclear reactor.

FIG. 1 shows a straight-tube steam generator comprising an outer casing 1 and two tube plates 2 and 3 fixed on the casing at its top and bottom ends, respectively. The tube plates 2 and 3 are pierced with holes through their entire thickness and straight, parallel tubes 4 are disposed between the two plates 2 and 3 in alignment with the holes passing through these plates. Jointly with a hemispherical casing 5, the bottom plate 3 delimits a water container 6 in communication with the inlet ends of the tubes 4. Jointly with a hemispherical casing 7, the plate 2 delimits a steam header 8 in communication with the outlet ends of the tubes 4. Between the water container 6 and the steam header 8, the outer casing 1 of the steam generator delimits a zone in which circulates the heat-transporting liquid metal, such as liquid sodium, which enters the casing 1 through a pipe 10 and leaves this casing through a pipe 11.

Water is introduced into the water container 6, which distributes it into the tubes 4 of the bundle. This water circulates in the tubes from bottom to top, is heated and is vaporized through the action of the heat given up by the heat-transporting liquid metal. The steam which is formed is recovered in the header 8.

Figure 2:
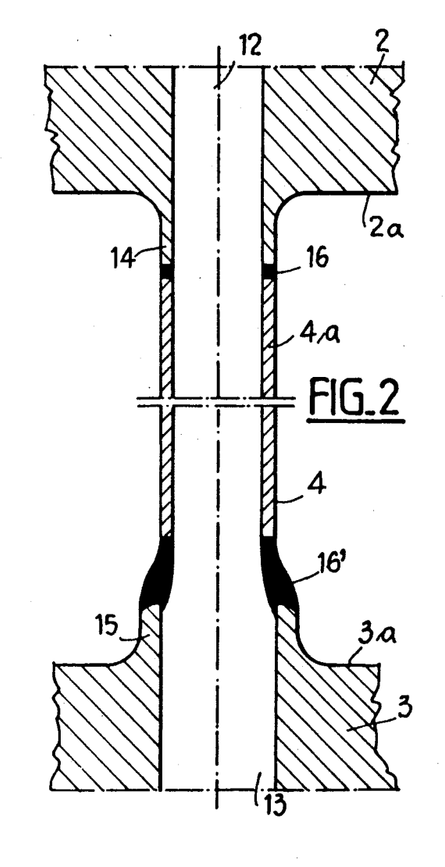
FIG. 2 is a view in section on a larger scale of the ends of a steam-generator tube which are connected to the first tube plate on the steam-header side and to the second tube plate on the water-container side of the steam generator, respectively.

FIG. 2 shows the ends of a tube 4 of the bundle, at the level of the zone of junction with the top tube plate 2 and of the zone of junction with the bottom tube plate 3, respectively. The junction is made by means of connectors 14 and 15 on the plates 2 and 3, respectively, projecting from the inside faces 2a and 3a of these tube plates. The connectors 14 and 15 of the tube plates 2 and 3, known as "nipples" are tubular and surround the outlet end of an opening 12 or 13 in the corresponding tube plate 2 or 3 on the faces 2a and 3a.

The diameter of the hole 13 passing through the plate 3 and the inside diameter of the bore of the nipple 15 are slightly greater than the outside diameter of the tube 4, which can be placed in position in the bundle, during manufacture, through the tube plate 3 before the casing 5 of the water container 6 is placed in position, or through an opening, provided with a removable stopper or cover and formed in the casing 5, such as a manhole or inspection hole. The casing 5 of the water container could optionally be removable as a whole. The top end 4a of the tube 4 is fixed on the end of the nipple 14 by butt welding, the junction being made by an annular weld 16.

The bottom part of the tube 4 is connected to the nipple 15 by means of a welded junction zone 16' of substantially frustoconical shape, formed by melting the end of the tube 4, engaged a short distance inside the nipple 15, and the end of the nipple 15.

Figure 3:
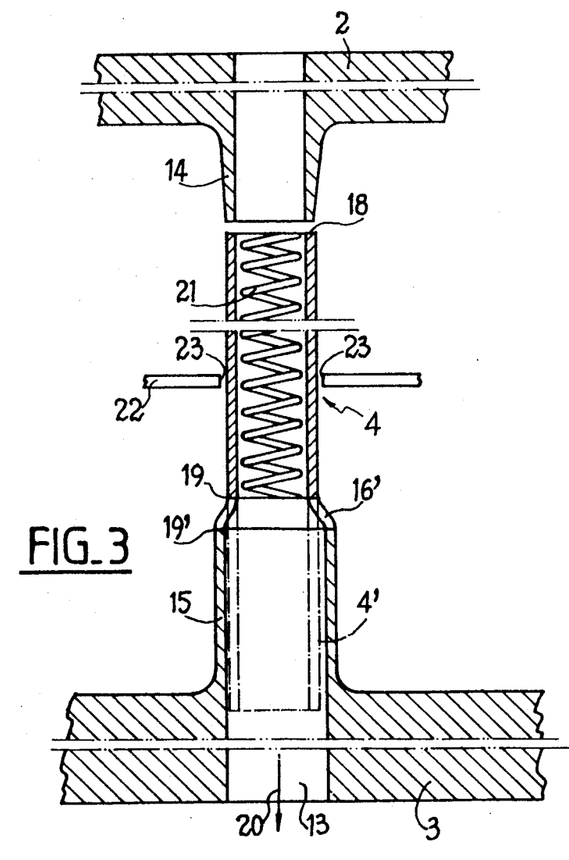
FIG. 3 is a partial view in axial section of a steam-generator tube which is being replaced, showing the general procedure for removal of the tube to be replaced.

FIG. 3 shows a part of a tube 4 which has a crack resulting in leakage, and the replacement of which is effected by the method according to the invention.

Corresponding elements in FIGS. 2 and 3 are given the same references.

The replacement of the tube 4, which requires in a first stage removal of the leaking defective tube and in a second stage the introduction and fixing of a replacement tube in the steam generator, is effected in the steam generator after removing the liquid sodium, cooling the steam generator and opening the removable outer walls 5 and 7 of the water container 6 and steam header 8, respectively, or opening the stoppers or cover provided. In this way, the outer face of the tube plates 2 and 3 is accessible, thus making it possible to introduce into the tube which is to be removed, by way of the openings passing through the plates 2 and 3, the tools required to make the cut and extract the tube 4 which is to be replaced.

In a general way, the tube 4 is removed by making a first transverse cut 18 on the tube in the vicinity of its zone of connection to the top nipple 14, and then two transverse cuts 19 and 19', one on each side of the junction zone 16' which has a generally frustoconical shape. The frustoconical connection zone 16' is cut in such a manner as to allow its extraction from the steam generator through the opening 13 in the tube plate 3. The tube 4 is then extracted from the steam generator through the opening 13, the diameter of which is greater than the outside diameter of the tube 4, as indicated by the intermediate position in dot-dash lines 4' of a part of the tube 4 and by the arrow 20 indicating the direction of movement of the tube 4 which permits its extraction.

A heating element 21, which may, for example, consist of a helically wound electrical resistor, is disposed inside the tube and supplied with heating electric current during the extraction of the tube 4. The heating of the tube 4 during its extraction makes it possible to melt any depositions of sodium remaining on the outer surface of the tube after the emptying of the steam generator. The liquefaction of the sodium depositions, such as 23, on the tube 4 makes it possible in particular to facilitate the extraction of the tube at the sites of grids, such as the grid 22 providing transverse support for the tubes 4 in the casing of the steam generator.

Figures 4, 5:
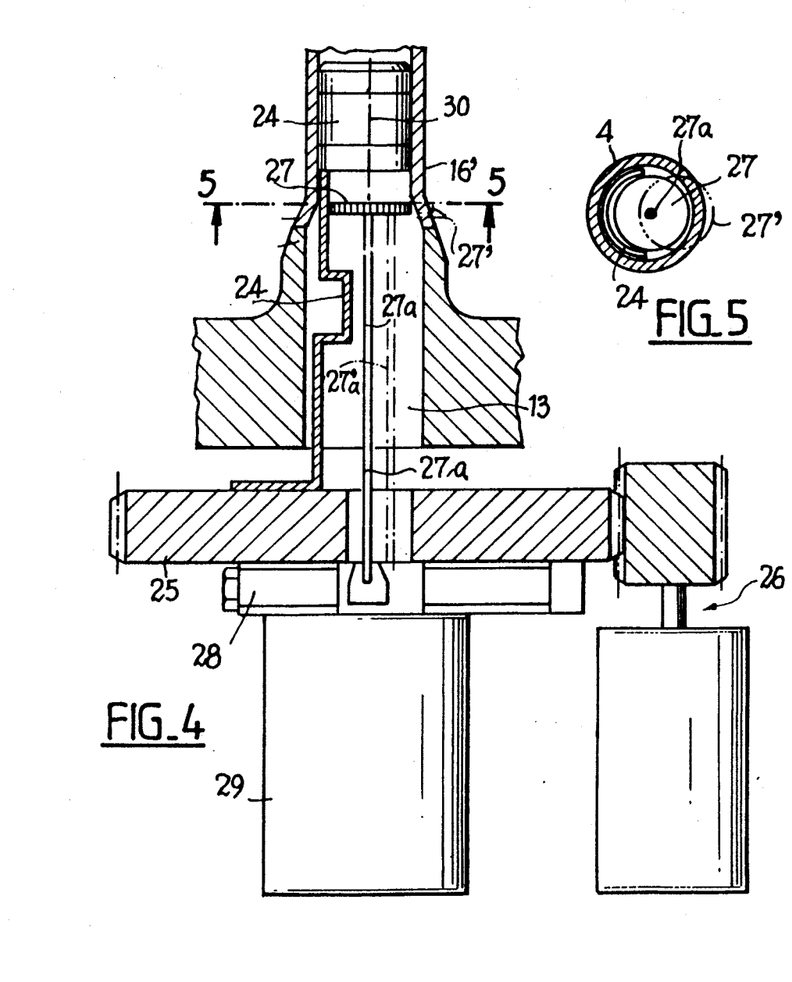
FIG. 4 is a view in section of the bottom end of a tube of the type shown in FIGS. 2 and 3, during its cutting.
FIG. 5 is a view in section along line 5—5 in FIG. 4.

The transverse cuts, such as 18, 19 and 19', in the junction zones of the tube 4 can be made with the aid of a device such as that illustrated in FIGS. 4 and 5.

This device for cutting a tube from the inside is well known and comprises a centering and guide assembly 24, a turntable 25, a turntable drive assembly 26, a cutter 27 mounted at the end of a shaft 27a, and a carriage 28 supporting the shaft 27a of the cutter 27 and its motor-reduction gear drive unit 29. The centering and guide device 24 is introduced into the bore 12 of the top tube plate or into the bore 13 of the bottom tube plate, as shown in FIG. 4, and then into the tube 4 to make the cut 18 or the cuts 19 and 19', respectively.

The device 24 comprises two parts connected together, one part effecting the centering in the tube 4 and the other the centering in the corresponding tube plate 2 or 3. The turntable 25 enables the cutting-tool assembly to make a complete revolution about the axis 30 of the tube 4.

The carriage 28 permits movement of the shaft 27a, at the end of which is fixed the cutter 27, and its motor-reduction gear rotational drive unit 29, in a radial direction of the turntable 25. This radial movement enables the feed movement of the cutter to be made between its positions 27 and 27' for the purpose of cutting the tube (see FIGS. 4 and 5).

After the tube 4 has been cut, i.e., the cuts 18, 19 and 19' have been made, the tube 4 is extracted from the steam generator in the manner indicated above.

With the aid of a device similar to the device shown in FIG. 4, and equipped with a tool of appropriate shape to replace the cutter 27, the cut zones situated at the ends of the nipples 14 and 15 and intended to form the junction zones of the tube plates and of a tube replacing the defective tube 4 are then cleaned and prepared. Deburring and machining, such as chamfering the ends of the nipples 14 and 15, are the usual operations.

Figure 6:
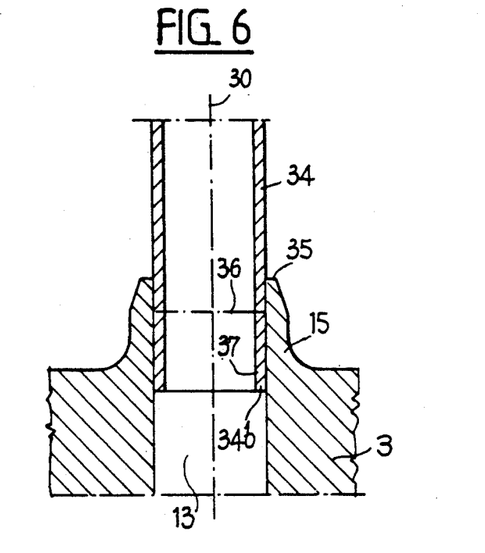
FIGS. 6, 7, 8 and 9 are views in section of the bottom part and of the corresponding connector of a replacement steam-generator tube in the course of different phases permitting its connection to the second tube plate of the steam generator.

As can be seen in FIG. 6, the replacement tube 34, which consists of a tube whose diameter is substantially identical to the diameter of the tube to be replaced and the soundness of whose wall has been carefully checked, is introduced into the steam generator through the opening 13 in the bottom tube plate 3 and is moved in the vertical direction corresponding to the axis 30 of the tube, inside the steam generator, until the top end of the tube 34 (not shown in FIG. 6) abuts against the end part of the nipple 14 of the top tube plate 2.

Using a conventional orbital welding device of known type, a circular junction weld is made from inside the tube between the top end of the tube 34 and the nipple 14, which is similar to the circular weld 16 shown in FIG. 2.

As can be seen in FIG. 6, the length of the tube 34 is such that, when the top part of the tube has been fixed on the nipple 14 by means of a circular weld, the bottom part 34b of the tube 34 is engaged over a certain length inside the nipple 15 and the opening 13 passing through the bottom tube plate 3.

The operations necessary for fastening the replacement tube 34 in the steam generator are identical to the operations necessary for installing and fastening a straight tube during manufacture of a steam generator at the factory, by the method described in FR-A-2,613,961.

The cross-sectional plane of the tube 34 situated exactly level with the end 35 of the nipple 15, when the tube 34 fixed at its top end to the nipple 14 is engaged by its bottom end 34b in the nipple 15, is marked.

The cross-sectional plane 36 situated at a predetermined axial distance d from the previously defined cross-sectional plane corresponding to the end 35 of the nipple 15 is accurately marked. The distance d which corresponds to the desirable length of engagement of the tube 34 in the nipple 15 in order to make the welded join between these two members, is generally equal to 2 millimeters.

Figure 7:
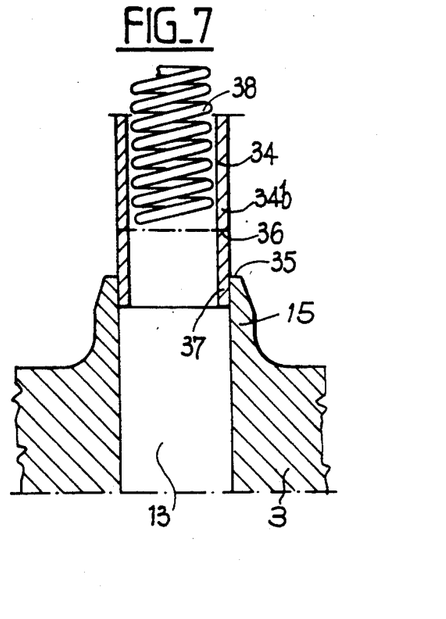

As can be seen in FIG. 7, a cooling coil 38, in which a fluid at very low temperature, such as liquid nitrogen, is circulated, is introduced into the tube 34. Cooling and thermal retraction of the tube 34 are thus achieved, so that the cross-sectional plane 36 previously marked is situated outside the bore of the nipple 15.

The tube 34 can then cut along the cross-sectional plane 36, making use of a device similar to the device shown in FIG. 4, without risk of damage to the inside wall of the nipple 15. This cutting operation makes it possible to remove the excess length 37 of the tube 34, this excess length 37 then being extracted from the steam generator by way of the opening 13 in the tube plate 3.

Figure 8:
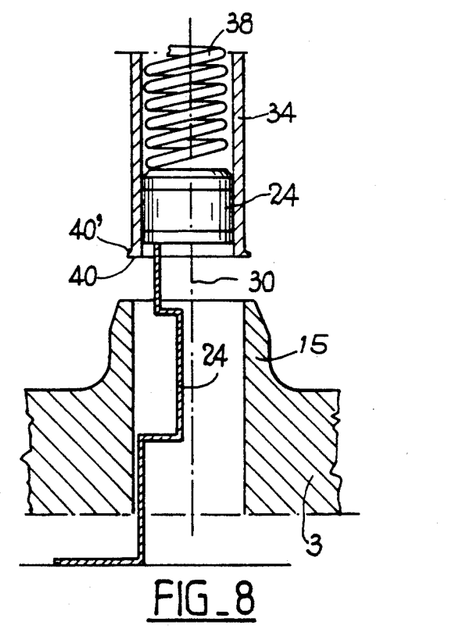

In FIG. 8 the cutting device similar to the device illustrated in FIG. 4 is shown in position in the tube 34 at the end of the cutting operation in the cross-sectional plane 36. The freshly cut end 40 of the tube 34 may have burrs 40', and therefore this end 40 of the tube is deburred on completion of the cut.

The cooling coil 38 is extracted from the tube 34, so that the tube returns to its original temperature.

Figure 9:
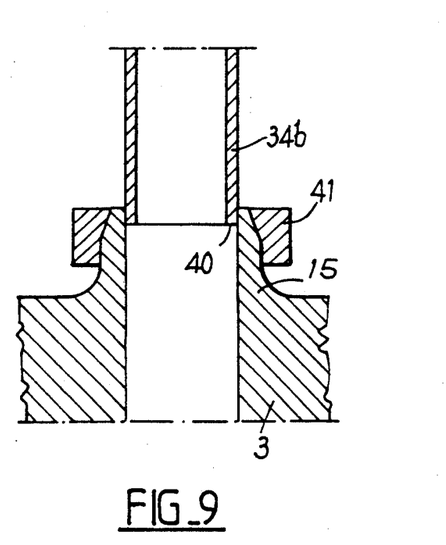

As can be seen in FIG. 9, the bottom end 34b of the tube 34 is engaged in the bore of the nipple 35 over a predetermined length d, which may for example, be 2 millimeters.

External reinforcements 41 are disposed around the nipple 15 in order to effect provisional fastening by expansion and flanging of the end 34b of the tube 34 inside the nipple 15.

The end of the tube 34 is then welded on the nipple 15 by a known process of orbital welding inside a tube. This welding is done with the end 40 of the tube 34 projecting position inside the nipple 15, in such a manner that gravity acts in the same direction over the entire length of the weld bead (overhang position), which greatly facilitates the operation of welding the tube 34 on the nipple 15.

It is to be noted that, during all the operations in the replacement of a steam-generator tube, the casing of the steam generator, from which the liquid sodium has previously been emptied out, is filled with a neutral gas such as argon. This neutral gas protects the weld on the outer surface side of the tube 34 and nipple 15 (reverse side).

The welding of the end 34b of the tube 34 on the nipple 15 makes it possible to form a junction zone of substantially frustoconical shape, similar to the junction zone 16' shown in FIG. 2.

When the replacement tube 34 has been fixed by welding on the nipples 14 and 15 of the steam generator, each of the welded joints is checked. This check can be made either by ultrasound inside the tube or by radiography.

Figure 10:
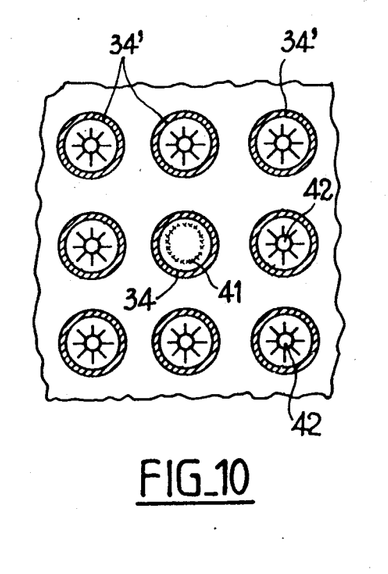
FIG. 10 is a view in cross-section of different tubes of the bundle of a steam generator during an operation of checking the welds of a replacement tube.

FIG. 10 shows the replacement tube 34 in position in the steam generator, together with the eight tubes 34' surrounding the tube 34. As can be seen in FIG. 10, the cross-sections of the tubes of the steam-generator bundle are disposed in a substantially square-meshed network in which each of the tubes is surrounded by eight tubes in neighboring arrangements. In cases where the welds of the replacement tube 34 have to be checked by radiography, a film 41 sensitive to X-rays is inserted into the tube 34 at the positions of the welds connecting this tube 34 to the corresponding nipples of the steam generator.

A radiation source 42 is disposed in each of the eight tubes 34' in such a manner as to radiograph the welds and the zones of the tube 34 adjoining the welded zones by transmission of radiation produced by the sources 42 through the weld or the wall of the tube 34 and by exposure of the sensitive film 41.

The films 41 are then extracted from the tube 34, developed and analyzed to determine the quality of the welds made. The quality of the welded joints of the replacement tube can thus be ensured.

The method according to the invention makes it possible to retain the initial performance of the steam generator, since the number of tubes in service is not modified by the repair operations. Similarly, all asymmetry in radial temperature distribution in the bundle is avoided because all the tubes of the bundle remain in place in the steam generator.

In cases where certain tubes of the bundle are plugged, radial temperature distribution may be considerably disturbed, and it may even be necessary, in order to reduce the asymmetry, to plug certain sound tubes in addition to the defective tube needing repair, thus bringing about a further reduction of the power of the steam generator.

In addition, the method according to the invention provides the advantage that the two welds joining the replacement tube to the tube plates are made in the overhang position, which is very favorable for obtaining a highly regular and highly homogeneous weld bead. With overhang welding, in fact, gravity acts in the same direction throughout the welding operation.

The cutting and welding operations are effected by introducing appropriate equipment through the outer face of one of the tube plates, so that the replacement of a tube in the bundle necessitates only limited dismantling of the steam generator.

The method according to the invention also makes it possible to envisage the designing of steam generators in which provision is made for the replacement of all the tubes of the bundle after a certain period of operation of the steam generator, which may, for example, correspond to one-third or half the life of this steam generator.

In this case the construction of the steam generator is more economical because, in the construction of the new steam generator, the thickness of the tubes can be reduced, thus making it possible to increase substantially the heat-exchange performance of these tubes and to reduce the cost of the steam generator. The reduction of thickness which can be envisaged is evaluated by taking into account a smaller thickness of penetration of the corrosion layer, a shorter creep time and a smaller number of fatigue cycles, because of a reduction of the operating time scheduled for the steam generator before complete retubing.

Moreover, it may reasonably be expected that, at the time of the retubing scheduled for a new steam generator leaving the factory, which should be carried out after an operating time of the steam generator of ten to twenty years, constant research and progress in connection with the material used to make the tubes will have made it possible to obtain a material whose performance will be considerably improved in comparison with that of the material of which the original tubes of the steam generator were made.

The method according to the invention is not limited to the mode of application which has been described, but may be applied equally well in cases where a single tube end is engaged by insertion into one of the connection nipples of a tube plate as in cases where both ends of the tube are engaged in the connection nipples of the two tube plates, the bore of the nipples being larger than the diameter of the tube.

In the second case the connection of these ends to the corresponding nipples is made by a junction zone of frustoconical shape.

In the course of the extraction of the tube which is to be replaced, the tube may be heated, as already indicated, in order to melt any depositions of heat-transporting metal, such as sodium, and then optionally cooled in order to facilitate its extraction, by thermal retraction.

During the operations of replacing the tube, the inside space of the heat exchanger, lying around the tubes of the bundle, may be filled with a protective gas of any kind, such as an inert gas or a neutral gas making it possible in particular to protect the weld zones on their outer side. In the case of a steam generator in which the primary fluid consists of a reactive liquid metal, such as liquid sodium, filling the central part of the steam generator, which during the normal operation of the reactor encloses the liquid sodium, with an inert gas after emptying out the liquid sodium, makes it possible to avoid any risk of bringing and oxidizing gas into contact with the sodium deposits which may remain in the central part of the steam generator.

Finally, the method according to the invention may be used to effect the replacement of one or more tubes of a heat exchanger other than a steam generator of a liquid sodium-cooled fast-neutron nuclear reactor. The method according to the invention is applicable to any straight-tube heat exchanger having two substantially parallel tube plates spaced apart and having, passing through them, openings at which the tubes are fixed by their ends.

We claim:

1. Method of replacing a tube (4) of a straight-tube heat exchanger comprising first and second substantially parallel tube plates 2, 3) spaced apart from one another and having, extending through them, openings (12, 13) at which tubes (4) are fixed at ends of said tubes by welding to connectors (14, 15), each of said tubes of a heat exchanger bundle having a first end fixed on a first connector (14) of said first tube plate (2), and a second end fixed on a second connector (15) of said second tube plate (3), an inside diameter of at least one of the connectors or second connector (15) and of a corresponding opening of the second tube plate (3) being substantially greater than an outside diameter of said tube (4) which is connected to said second connector (15) by a junction zone (16') of substantially frustoconical shape, said method comprising the steps of (a) cutting said tube (4) transversely in the vicinity of the connectors (14, 15), at each end, from the interior of said tube (4) and through one of said tube plates (2, 3);
   (b) cutting and extracting from the heat exchanger space between tube plates, the junction zone (16') connecting said tube (4) to the second connector (15);
   (c) extracting said tube from said heat exchanger space between said tube plates (2, 3), through the interior of the second connector (15) and through a corresponding opening (13) in said second tube plate (3);
   (d) cleaning and remachining zones (18, 19') of the connectors where the cuts were made;
   (e) introducing a replacement tube (34) into said heat exchanger by way of the opening (13) in said second tube plate until a first end of said replacement tube (34) first engaged in said heat exchanger reaches the level of the cut zone (18) of said first connector (14);
   (f) joining the first end of said replacement tube (34) to said first connector (14) by an overhang weld;
   (g) adjusting the length of said replacement tube (34) so that its second end (34b) is engaged over a predetermined length in said second connector (15); and
   (h) joining the second end of said replacement tube (34) to the interior of said second connector (15) by an overhang weld.

2. Method according to claim 1, for replacing a tube (4) which has a first end connected to said first connector (14), whose diameter is substantially equal to the diameter of said tube, by an annular butt joint connecting weld (16) made in an overhang position, and a second end connected to said second connector (15), whose inside diameter is substantially greater than the diameter of said tube, by a junction zone (16') of frustoconical shape, comprising introducing said replacement tube (34) into said heat exchanger until its first end comes to abut against the cut zone (18) of said first connector (14) and butt welding on said first connector (14).

3. Method according to claim 1, wherein said first connector (14) and said second connector (15) have an inside diameter greater than the diameter of said tube (4) to be replaced and the ends of said tube are both connected to said connectors (14, 15) by junction zones (16') of frustoconical shape, comprising the steps of introducing said replacement tube (34) into said heat exchanger until its first end penetrates into said first connector (14) over a predetermined length, and welding the first end of said replacement tube (34) and then the second end in an overhang position inside the corresponding connectors (14, 15).

4. Method according to any one of claims 1 to 3, comprising establishing a neutral gas atmosphere around said tube (4) throughout the replacement of said tube (4) by a said replacement tube (34).

5. Method according to claim 4, in the case of a heat exchanger comprising a bundle of tubes surrounded by a casing (1) fixed to said tube plates (2, 3), comprising filling said casing (1) of said heat exchanger with a neutral gas during replacement of a tube (4) of the bundle.

6. Method according to claim 1, comprising adjusting the length of said replacement tube (34) by cutting said replacement tube (34) at its second end (34b), after said replacement tube (34) has been cooled, in such a manner that the cut zone (36) of the second end (34b) of said replacement tube (34) is located outside said second connector (15) during cutting.

7. Method according to claim 1, comprising heating said tube (54) during its extraction, from the inside of said second connector (15) and the corresponding opening (13) of said second tube plate (3).

8. Method according to claim 1, comprising cooling the tube (4) to be replaced during its extraction, from the inside of said second connector (15) and the corresponding opening (13) of said second tube plate (3).

* * * * *

UNITED STATES PATENT AND TRADEMARK OFFICE
CERTIFICATE OF CORRECTION

PATENT NO. : 5,205,038
DATED : April 27, 1993
INVENTOR(S) : Archer et al

It is certified that error appears in the above-identified patent and that said Letters Patent is hereby corrected as shown below:

On the title page, item (21):

application serial number is --762,468--.

Signed and Sealed this

Thirtieth Day of August, 1994

Attest:

BRUCE LEHMAN

Attesting Officer

Commissioner of Patents and Trademarks